United States Patent [19]
Jacobson et al.

[11] Patent Number: 5,851,652
[45] Date of Patent: Dec. 22, 1998

[54] LIGHTFAST T102 PIGMENT

[75] Inventors: Howard W. Jacobson; Andrew A. Feng, both of Wilmington, Del.

[73] Assignee: E. I. du Pont de Nemours and Company, Wilmington, Del.

[21] Appl. No.: 701,518

[22] Filed: Aug. 22, 1996

Related U.S. Application Data

[63] Continuation of Ser. No. 321,661, Oct. 12, 1994, abandoned, which is a continuation of Ser. No. 958,828, Oct. 9, 1992, abandoned.

[51] Int. Cl.$^6$ ...................................................... B32B 5/16
[52] U.S. Cl. ..................... 428/328; 106/436; 106/439; 106/442; 106/443; 106/446; 428/329; 428/331; 428/342; 428/537.5
[58] Field of Search ................................. 428/403, 404, 428/407, 699, 328, 329, 342, 421, 537.5, 331; 106/436, 439, 442, 443, 446

[56] References Cited

U.S. PATENT DOCUMENTS

| | | | |
|---|---|---|---|
| Re. 32,320 | 12/1986 | Jacobson | 428/530 |
| 3,859,115 | 1/1975 | Wiseman et al. | 117/70 A |
| 3,942,999 | 3/1976 | Hinley et al. | 106/300 |
| 3,960,589 | 6/1976 | Morrison et al. | 106/296 |
| 4,239,548 | 12/1980 | Barnard et al. | 106/300 |
| 4,405,376 | 9/1983 | Matsunaga et al. | 106/300 |
| 4,460,655 | 7/1984 | Jacobson | 428/530 |
| 4,461,810 | 7/1984 | Jacobson | 428/530 |
| 4,737,194 | 4/1988 | Jacobson | 106/300 |
| 4,752,340 | 6/1988 | Brand et al. | 106/300 |
| 5,338,354 | 8/1994 | Melville et al. | 106/442 |
| 5,478,550 | 12/1995 | Suzuki et al. | 424/59 |

*Primary Examiner*—H. Thi Le

[57] ABSTRACT

Rutile $TiO_2$ pigment particles bearing coatings comprising:

(a) an inner layer comprising about 0.05–1 percent by weight, based on the weight of the $TiO_2$, of cerium radicals and about a stoichiometric amount of phosphate radicals, based on the amount of cesium radicals, (b) a second layer of about 0.1–4 percent by weight, based on the weight of the $TiO_2$, of amorphous silica, and optionally (c) an outer layer of (1) about 0.5 to 8 percent by weight, based on the weight of the $TiO_2$, of hydrous alumina or (2) hydrous alumina in the amount of about 0.5–8 percent, based on the weight of the $TiO_2$, and associated therewith up to about a stoichiometric amount of phosphate radicals needed to form aluminum phosphate, the combined total weight of said coatings being about 2 to 12 percent by weight, based on the weight of the $TiO_2$.

6 Claims, No Drawings

LIGHTFAST TIO2 PIGMENT

This is a continuation of application Ser. No. 08/321,661 filed Oct 12, 1994, now abandoned which is a continuation of application Ser. No. 07/958,828 filed Oct 9, 1992, now abandoned.

BACKGROUND OF THE INVENTION

This invention relates to coated $TiO_2$ pigment having a high degree of lightfastness. The pigment is particularly useful in applications that have significant exposure to ultraviolet light. One such application is in paper laminates incorporated in rigid polymer matrixes that are used to make counter tops, cabinets, and furniture.

Several classes of pigments exist that exhibit lightfastness and are suitable for use where there will be exposure to high levels of ultraviolet light. However, such pigments have one or more deficiencies. One example is $TiO_2$ pigment that has been coated with one or more hydrous oxides and then calcined. While the calcining produces an acceptable pigment, the process is expensive. Other examples are $TiO_2$ pigments that have various coatings such as disclosed in U.S. Pat. Nos. 4,239,548, 4,460,655, 4,461,810, and 3,960,589. A deficiency with such coated pigments, however, is that they often flocculate when they are dispersed in aqueous media of pH about 6–8. This is undesirable because $TiO_2$ dispersed in aqueous media of such pH is often used to impregnate paper that is incorporated into laminates of rigid polymer matrixes.

Hence the need exists for non-calcined $TiO_2$ pigment that exhibits good lightfastness and does not flocculate when incorporated in aqueous media of pH about 6–8.

SUMMARY OF THE INVENTION

In accordance with this invention there is provided:

Rutile $TiO_2$ pigment particles bearing coatings comprising:

(a) an inner layer comprising about 0.05–1 percent by weight, based on the weight of the $TiO_2$, of cerium radicals and about a stoichiometric amount of phosphate radicals, needed to form cerium phosphate, (b) a second layer of about 0.1–4 percent by weight, based on the weight of the $TiO_2$, of amorphous silica, and optionally (c) an outer layer of (1) about 0.5 to 8 percent by weight, based on the weight of the $TiO_2$, of hydrous alumina or (2) hydrous alumina in the amount of about 0.5–8 percent, based on the weight of the $TiO_2$, and associated therewith up to about a stoichiometric amount of phosphate radicals needed to form aluminum phosphate, the combined total weight of said coatings being about 2 to 12 percent by weight, based on the weight of the $TiO_2$.

Also in accordance with this invention there is provided the following process:

Process for forming coatings on $TiO_2$ pigment comprising:

(a) contacting $TiO_2$ pigment in aqueous media with about 0.05–1 percent by weight, based on the weight of the $TiO_2$, of cerium radicals, and about a stoichiometric amount of phosphate radicals, based on the amount of cerium radicals, said contacting taking place at a pH of about 0.5–4, (b) contacting the product of step (a) with silicate radicals in the amount of about 0.1–4 percent by weight, (calculated as $SiO_2$), based on the weight of the $TiO_2$, said contacting taking place at a pH of about 6.5–9, and (c) contacting the product of step (b), at a pH of about 6–9, with (i) aluminate radicals, in the amount of about 0.5–8 percent by weight (calculated as $Al_2O_3$), based on the weight of the $TiO_2$, or (ii) aluminate radicals, in the amount of about 5–8 percent by weight (calculated as $Al_2O_3$), based on the weight of the $TiO_2$, and associated therewith up to about a stoichiometric amount of phosphate radicals needed to form aluminum phosphate, the combined total weight of the coating being applied with steps (a), (b), and (c) being about 2 to 12 percent by weight, based on the weight of the $TiO_2$ pigment.

It has been found that the pigment of this invention exhibits excellent lightfastness, does not need calcining to produce it, and does not flocculate in aqueous media of pH about 6–8.

DETAILED DESCRIPTION OF THE INVENTION

Rutile $TiO_2$ pigment produced by either the chloride process or the sulfate process is suitable for use in this invention. Preferred is $TiO_2$ produced by the chloride process.

Also, one can use as the starting material $TiO_2$ pigment that has been previously coated with (1) an inner layer comprising about 0.05–1 percent by weight, based on the weight of the $TiO_2$, of cerium radicals and about a stoichiometric amount of phosphate radicals, based on the amount of cerium radicals, and (2) an outer layer of (i) about 0.5 to 8 percent, based on the weight of the $TiO_2$, of hydrous alumina or (ii) hydrous alumina in the amount of about 0.5–8 percent, based on the weight of the $TiO_2$, and associated therewith, up to about a stoichiometric amount of phosphate radicals needed to form aluminum phosphate.

In brief summary, the coated $TiO_2$ pigment of this invention is produced by contacting, in aqueous media, rutile $TiO_2$ pigment with suitable water soluble salts, compounds, and/or acids of cerium, phosphate, silica, alumina, and optionally fluoride (hereinafter sometimes referred to as "reagents"). Ordinarily, the contacting of the $TiO_2$ with the salts, compounds, and/or acids will take place successively so that the desired sequence of layers of coatings are formed (i.e., inner coating, second layer, and optionally outer layer). However, it may be possible to combine some of the reagents for the coating process. For example, the cerium and phosphate reagents may be combined, and the fluoride reagents may be combined with the reagents used to form the inner layer, outer layer or both.

Ordinarily, the pigments of this invention will be formed by dispersing $TiO_2$ pigment in water and then mixing successively, with such dispersion, the desired reagents. The concentration of the $TiO_2$ pigment is not critical. Typical concentrations can be about 10–600, preferably about 50–500, and most preferably about 200–500 grams of $TiO_2$ per liter of aqueous $TiO_2$ slurry.

The pH used for the coating process generally will be about 0.9–9. Within this range, the pH can be adjusted as required to cause the desired radicals or compounds to coat, flocculate or precipitate onto the $TiO_2$ pigment.

Generally, the temperature used is not critical. For example, the temperature of the aqueous media can be about 25–100 degrees C., preferably about 25–80 degrees C., and most preferably about 40–80 degrees C.

Generally, after the $TiO_2$ pigment is treated with each desired reagent it will be cured, preferably with mixing, until the desired deposition radicals, and/or compounds occurs. Often, suitable curing times will be about 0.5–60 minutes, and preferably about 1–30 minutes.

The radicals and compounds forming the coated pigment of this invention are associated with the pigment particle surfaces. "Associated with the pigment particle surfaces" means that the radicals or compounds are bound to the $TiO_2$ particles by a chemical or physical attraction.

The amount of radicals associated with the $TiO_2$ pigment can be determined by ion chromatography or ion plasma chromatography. Also, such amount of radicals can be measured in the oxidized form by X-ray fluorescence.

Cerium:

The cerium radicals forming the first layer can be supplied by any suitable water soluble cerium salt, including, but not limited to, cerium nitrate, ceric nitrate, cerium sulfate, and ceric sulfate. Sufficient cerium salt should be used to provide about 0.05–1 percent and preferably about 0.1–0.3 percent, by weight of cerium, based on the weight of $TiO_2$.

Phosphate:

The phosphate radicals forming part of the first layer can be supplied by any water soluble phosphate salt or acid such as phosphoric acid, ammonium orthophosphate or an alkali metal phosphate such as sodium phosphate. Sufficient phosphate salt and/or phosphoric acid should be used to provide about a stoichiometric amount of phosphate radicals, based on the amount of cerium radicals used. The pH for forming the first layer ordinarily will be about 0.5–4.

Silica:

The silica for the second layer can be supplied by any suitable source such as water soluble silicate salt. Examples include, but are not limited to, sodium silicate and potassium silicate. Preferably, for forming this layer, the pH will be adjusted to about 6.5–9, and the required amount of silicate will be added. Upon the addition of the silicate, the pH will rise and should then be reduced, by the addition of acid, to about pH 7–8, and preferably about pH 8 to deposit the silica on the $TiO_2$. Hydrochloric and sulfuric acid are preferred. The amount of silica should be about 0.1–4 percent, preferably about 0.5–3, and most preferably about 1–2 percent, based on the weight of the $TiO_2$. Generally the silica will be in amorphous form.

Hydrous Alumina:

Suitable sources of hydrous alumina include any water soluble salts thereof, including, but not limited to, sodium aluminate, potassium aluminate, and $Na\,Al(OH)_4$. For forming this layer, acid, ordinarily sulfuric or hydrochloric, is added as necessary to maintain the pH within the range of about 6–9. The amount of hydrous alumina generally will be about 0.5–8 percent, preferably about 1–6 percent and most preferably about 2–4 percent, based on the weight of the $TiO_2$. If phosphate radicals are to be associated with the hydrous alumina, one can use as sources of such radicals those described under the above heading "Phosphate".

Fluoride:

Optionally, the inner layer, the outer layer or both the inner layer and the outer layer can contain fluoride radicals. If fluoride radicals are used, they generally should constitute about 0.05–2 percent, and preferably about 0.2 to 0.6 percent by weight, based on the weight of the $TiO_2$. If fluoride radicals are used in the outer layer, they often will comprise up to about 25 percent by weight, based on the amount of the hydrous alumina. Suitable water soluble salts that can be used as sources of fluoride anion include KF, $NH_4F$, LiF, and preferably NaF.

Fluoride Compounds:

Optionally, the inner layer can contain about 0.4–8 percent, preferably 0.8–4 percent and most preferably about 0.8–2 percent, based on the weight of the $TiO_2$, of a fluoride compound. Examples of suitable fluoride compounds include:

$K_7Ce_6F_{31}$ $Na_7Ce_6F_{31}$ $Li_7Ce_6F_{31}$ $(NH_4)_7Ce_6F_{31}$

Preferred are $K_7Ce_6F_{31}$, $Na_7Ce_6F_{31}$ or mixtures thereof

The pigment of the invention that has a fluoride compound associated with its particles may be prepared by first preparing an aqueous slurry of $TiO_2$ and then generating the fluoride compound in it in situ. This is done according to the illustrative equation $$31NaF + 6Ce(SO_4)_2 \rightarrow Na_7Ce_6F_{31} + 12Na_2SO_4$$

Illustrative of cerium salts which may be used are ammonium ceric nitrate, ceric nitrate, and ceric sulfate. Ceric sulfate is preferred.

The amounts of an appropriate cerium salt and a fluoride required to give the desired concentration of fluoride compound in the pigment are added to the slurry in ratios dictated by the stoichiometry of the equation. The slurry is then processed as previously described.

Separation of Pigment: Preparation of Paper Laminates and Coating Compositions

After the $TiO_2$ pigment has been coated, it can be separated from the aqueous media by any suitable means including filtering or centrifuging. Then, the pigment can be washed with water and dried.

The pigment thus prepared may be used to prepare a paper laminate in any of the customary ways typically by mixing the pigment with paper pulp and then making paper of it in the usual way, impregnating this paper with resin, ordinarily a melamine-formaldehyde, urea-formaldehyde or phenol-formaldehyde resin, and then curing the mixture with heat. These procedures are set forth in greater detail in U.S. Pat. No. 4,239,548, which is hereby incorporated by reference. When cured, the resulting product is a paper laminate incorporated in a rigid polymer matrix.

Coating compositions may be prepared with the pigments of this invention in any of the conventional ways, by blending the pigment with a film-forming component and a liquid carrier. The film forming component can be any polymer suitable for paint making, including, but not limited to, acrylics, urethanes, alkyds, epoxies, etc.

The following examples illustrate this invention. For the examples, all percentages are on a weight basis unless otherwise specified. 5

EXAMPLES

Example 1

A $TiO_2$ pigment in accordance with this invention was prepared as follows:

(1) A slurry of 450 grams of rutile $TiO_2$ per liter was prepared and the pH adjusted to slightly above 7 to neutralize the acid chloride associated with the chloride process for producing $TiO_2$ pigment.

(2) The pH of the slurry was adjusted to 2.0 to 2.5 with sulfuric acid.

(3) Sufficient ceric nitrate was added to give, nominally, 0.18% by weight of $CeO_2$, based on the weight of the $TiO_2$, and the slurry was cured for 30 minutes.

(4) Sufficient phosphoric acid was added to give, nominally, 1.6% by weight of $P_2O_5$, based on the weight of $TiO_2$, and the slurry was cured for 30 minutes. The amount of phosphoric acid was sufficient to form cerium phosphate and aluminum phosphate in step (6).
(5) The pH of the slurry was raised to 7.0–7.5 with caustic soda solution.
(6) Sufficient sodium aluminate solution was added to give, nominally, 3.5% by weight of $Al_2O_3$, based on the weight of $TiO_2$, with simultaneous addition of sulfuric acid to maintain pH, and then the slurry was cured for 30 minutes.
(7) The slurry pH was adjusted to 6.0 to 7.0, and then filtered washed, and dried.
(8) The dried pigmentary $TiO_2$ was ground in a steam micronizer.
(9) The ground $TiO_2$ was mixed with deionized water at 80 degrees Celsius to form a slurry at a concentration of 190 grams to $TiO_2$ per liter.
(10) The pH of the slurry was adjusted to 7.5.
(11) Sufficient potassium silicate solution was added to give, nominally, 2% by weight of $SiO_2$, based on the weight of $TiO_2$.
(12) The pH was adjusted to 8, and the slurry was cured for 15 minutes.
(13) Sufficient $NaAl(OH)_4$ was added to give, nominally 2% by weight of $Al_2O_3$, based on the weight of $TiO_2$, with simultaneous addition of hydrochloric acid to maintain pH.
(14) The slurry was cured for 30 minutes at pH 8.
(15) The slurry was filtered, rinsed, and dried at 120 degrees Celsius.

Example 2

Example 1 was repeated except that steps (12) and (13) were omitted, to give no outer coating of alumina.

Example 3

Example 1 was repeated except that steps (9) through (15) were omitted, to give a control with no silica coating.

Example 4

To show the effect of the invention in suppressing the photosensitivity of paper laminates pigmented with $TiO_2$, color measurements were made on paper laminates, prepared with $TiO_2$ pigment from each example, before and after exposure to intense UV light for 3 hours. Values of delta E*, a measure of color difference, were calculated from observations with a Hunterlab LabScan spectrocolorimeter. Delta E* represents the change in color reflectivity of a laminate after the UV exposure. It is calculated using the following color difference formula:

Delta E*=square root of [square of (delta L*)+square of (delta a*)+square of (delta b*)]

where L*, a*, and b* are the color space coordinates defined by CIE (Commission International de Eclairage which is sometimes referred to as the International Commission on Illumination) in 1976.

The isoelectric point ("IEP") for each of the $TiO_2$ pigments from Examples 1–3 was also determined. IEP is the pH at which the particles will not migrate in an electric field, and is determined from electrophoretic measurements. IEP measurements were made using an automated Pen Kem System electrokinetics analyzer 3000 manufactured by Pen Kem Inc., Bedford Hills, N.Y. The instrument measures the electrophoretic mobility of particles in a dilute suspension. Measurements are made at different pHs, and by plotting the results the isoelectric point, i.e., the pH at which the zeta potential is zero, is found.

Results are shown in Table I. It should be noted that the lower the value of Delta E*, the less change in color reflectivity there has been.

TABLE 1

| Example | Delta E* | Isoelectric Point (pH) |
|---|---|---|
| 1 (C/P* + hydrous alumina having associated with it phosphate radicals + silica + hydrous alumina) | 0.58 | 3.5 |
| 2 (C/P* + hydrous alumina having associated with it phosphate radicals + silica) | 0.64 | 2.5 |
| 3 Control (C/P* + hydrous alumina having associated with it phosphate radicals) | 0.78 | 8.0 |

*Cerium radicals and about a stoichiometric amount of phosphate radicals, based on the amount of cerium radicals.

Note that in regard to the above, Examples 1 and 2 exhibit superior lightfastness (measured by lower Delta E* value). Also, Examples 1 and 2 exhibit low isoelectric points, which makes them suitable for use in aqueous systems for coating or impregnating $TiO_2$ on paper.

Examples 5–9

Pigment preparation (1) Place 1200 ml. deionized water into 2 liter beaker.
(2) Heat the bath to 55–60 degrees C.
(3) Add 200 gm. $TiO_2$ of Example 3 to the bath.
(4) Adjust bath pH to 7.5.
(5) Add 8 gm. $K_2SiO_3$ solution to the bath for every 1% $SiO_2$, by weight of the $TiO_2$, deposited on the pigment. Record bath pH.
(6) Stir for 15 min.
(7) Add 20% $H_2SO_4$ solution to the bath over a 30 min. period to readjust pH back to 7.5.
(8) Cure for 15 min. with bath at pH 7.5 and 60 degrees C.
(9) Add 5 ml $NaAl(OH)_4$ Vinings solution (for every 1% $Al_2O_3$, by weight of the $TiO_2$, deposited on the pigment) to the bath over 1 hour at pH 7.0–7.5, using $H_2SO_4$ to maintain pH.
(10) Cure for 30 min. with bath at pH 7.5 and 57 degrees C.
(11) Filter, wash till sulfate free, dry overnight at 120 degrees C.

For examples 6 and 7, steps 5–8 were omitted, i.e., no $SiO_2$ coating was applied.

Example 9 was a control, i.e., the pigment of Example 3. Results are shown in Table II below.

TABLE II

| Example | Delta E* | Isoelectric Point (pH) |
|---|---|---|
| 5. (C/P* + hydrous alumina having associated with it phosphate radicals, + 4% silica + 2% hydrous alumina) | 0.66 | 3.0 |
| 6. (C/P* + hydrous alumina having associated with it phosphate radicals, | 1.03 | 8.2 |

TABLE II-continued

| Example | Delta E* | Isoelectric Point (pH) |
|---|---|---|
| + 2% hydrous alumina) | | |
| 7. (C/P* + hydrous alumina having associated with it phosphate radicals + 1.5% hydrous alumina) | 0.84 | 8.0 |
| 8. (C/P* + hydrous alumina having associated with it phosphate radicals + 2% silica + hydrous alumina) | 0.77 | 3.2 |
| 9. (C/P* + 1% hydrous alumina having associated with it phosphate radicals, i.e., Example 3) | 0.74 | 7.2 |

*Cerium radicals and about a stoichiometric amount of phosphate radicals, based on the amount of cerium radicals.

For Table II, Examples 5 and 8 are within the claims of this invention, and Examples 6, 7, and 9 represent pigments of the prior art. Note that for Examples 5 and 8, the Delta E* values represent excellent lightfastness, and the isoelectric points indicate that such pigments will be suitable for incorporation in aqueous media for impregnating paper laminates.

The invention claimed is:

1. Rutile $TiO_2$ pigment particles bearing coatings consisting essentially of, in sequence:
   (a) an inner layer comprising about 0.05–1 percent by weight, based on the weight of the $TiO_2$, of cerium radicals and about a stoichiometric amount of phosphate radicals needed to form cerium phosphate,
   (b) a second layer of about 0.1–4 percent by weight, based on the weight of the $TiO_2$, of uncalcined amorphous silica, and optionally
   (c) an outer layer of (1) about 0.5 to 8 percent by weight, based on the weight of the $TiO_2$, of hydrous alumina or (2) hydrous alumina in the amount of about 0.5–8 percent, based on the weight of the $TiO_2$, and associated therewith up to about a stoichiometric amount of phosphate radicals needed to form aluminum phosphate, the combined total weight of said coatings being about 2 to 12 percent by weight, based on the weight of the $TiO_2$, said particles not flocculating in aqueous media having a pH of about 6 to 8.

2. The $TiO_2$ pigment of claim 1 wherein between the inner layer and the second layer there is interposed (a) a layer of hydrous alumina in the amount of about 0.5–8 percent, based on the weight of the $TiO_2$ or (b) hydrous alumina in the amount of about 0.5–8 percent, based on the weight of the $TiO_2$, and associated therewith up to about a stoichiometric amount of phosphate radicals needed to form aluminum phosphate.

3. The $TiO_2$ pigment of claim 1 wherein the inner layer is further comprised of about 0.4–8 percent, based on the weight of the $TiO_2$, of one or more fluoride compounds selected from the group consisting of $K_7Ce_6F_{31}$, $Na_7Ce_6F_{31}$, $Li_7Ce_6F_{31}$, and $(NH_4)_7Ce_6F_{31}$ and the outer layer is comprised of hydrous alumina and up to about 25 percent by weight, based on the weight of the hydrous alumina, of fluoride radicals.

4. The $TiO_2$ pigment of claim 1 wherein layers (b) and (c) are applied to $TiO_2$ pigment that has previously been coated with (1) an inner layer comprising about 0.05–1 percent by weight, based on the weight of the $TiO_2$, of cerium radicals and about a stoichiometric amount of phosphate radicals needed to form cerium phosphate, and (2) an outer layer of (i) about 0.5 to 8 percent, based on the weight of the $TiO_2$, of hydrous alumina or (ii) hydrous alumina in the amount of about 0.5–8 percent, based on the weight of the $TiO_2$, and associated therewith up to about a stoichiometric amount of phosphate radicals needed to form aluminum phosphate.

5. Paper incorporating the $TiO_2$ pigment of any one of claims 1–4, said paper impregnated with a cured resin.

6. A coating composition comprising:
   (a) a pigment according to any one of claims 1–4,
   (b) a film forming material, and
   (c) a liquid carrier.

* * * * *